(12) United States Patent
Mikhailov et al.

(10) Patent No.: US 11,613,319 B2
(45) Date of Patent: Mar. 28, 2023

(54) TRAILER LIGHTING ACTIVATION DEVICE (71) Applicant: U-Haul International, Inc., Phoenix, AZ (US)

(72) Inventors: Michael Mikhailov, Scottsdale, AZ (US); William Craig, Gilbert, AZ (US)

(73) Assignee: U-HAUL INTERNATIONAL, INC., Phoenix, AZ (US)

( * ) Notice: Subject to any disclaimer, the term of this patent is extended or adjusted under 35 U.S.C. 154(b) by 72 days.

(21) Appl. No.: 17/031,561

(22) Filed: Sep. 24, 2020

(65) Prior Publication Data
US 2021/0086853 A1 Mar. 25, 2021

Related U.S. Application Data (60) Provisional application No. 62/904,876, filed on Sep. 24, 2019.

(51) Int. Cl.
H05B 47/11 (2020.01)
H05B 47/25 (2020.01)
B62D 63/08 (2006.01)
G01J 1/42 (2006.01)
B60Q 1/30 (2006.01)
H05B 45/14 (2020.01)
B60D 1/62 (2006.01)
B60Q 11/00 (2006.01)
B60Q 1/26 (2006.01)

(52) U.S. Cl.
CPC ............ B62D 63/08 (2013.01); B60Q 1/305 (2013.01); G01J 1/4204 (2013.01); H05B 45/14 (2020.01); H05B 47/11 (2020.01); H05B 47/25 (2020.01); B60D 1/62 (2013.01); B60Q 1/26 (2013.01); B60Q 11/005 (2013.01)

(58) Field of Classification Search
CPC ........ B62D 63/08; H05B 47/11; H05B 47/25; H05B 45/14; B60Q 1/305; B60Q 1/26; B60Q 11/005; G01J 1/4204; B60D 1/62
See application file for complete search history.

(56) References Cited

U.S. PATENT DOCUMENTS

| 4,859,982 | A | 8/1989 | Seaburg |
| 5,195,813 | A | 3/1993 | Brown |
| 5,198,798 | A | 3/1993 | Lietzow |
| 6,545,600 | B1 | 4/2003 | Boner |
| 8,061,879 | B2 | 11/2011 | Simmons |

(Continued)

Primary Examiner — Henry Luong
(74) Attorney, Agent, or Firm — Richard E. Oney; Venjuris, P.C.

(57) ABSTRACT

A trailer lighting activation system includes a vehicle light sensor, an ambient light sensor, and a microcontroller. The vehicle light sensor is removably attached to a towing vehicle light to detect a light output of the towing vehicle light, and to provide a vehicle light sensor output signal in response to the light output of the towing vehicle light. The ambient light sensor can detect an ambient light level and provide an output signal in response to the ambient light level. The microcontroller is coupled to the vehicle light sensor output and to the ambient light sensor and has an output for energizing a trailer light in response to the ambient light sensor output signal and the vehicle light sensor output signal. An overcurrent monitor is coupled to the trailer light and to monitor current drawn by the trailer lighting activation system.

15 Claims, 9 Drawing Sheets (56) References Cited

U.S. PATENT DOCUMENTS

| | | | |
|---|---|---|---|
| 2002/0167589 A1* | 11/2002 | Schofield | B60Q 5/006 |
| | | | 348/E7.086 |
| 2008/0258899 A1* | 10/2008 | Stiles | B60Q 1/305 |
| | | | 340/471 |
| 2012/0191270 A1 | 7/2012 | Floyd | |
| 2014/0265843 A1* | 9/2014 | Troxler | B60Q 1/2673 |
| | | | 315/77 |
| 2018/0229786 A1* | 8/2018 | Weaver | B62D 63/08 |

* cited by examiner

TRAILER LIGHTING ACTIVATION DEVICE

BACKGROUND

The present invention generally relates to a trailer lighting activation system that does not require the installer to modify or electrically connect to towing vehicle wiring. In particular, the invention relates to a system that converts the optical output of a towing vehicle's rear lamps into electrical signals, which are then used to activate the trailer lights. The system can be fitted to any towing vehicle without modifying or tapping into the towing vehicle wiring.

The rental truck industry regularly equips vehicles for towing. In doing so, contemporary methods of attaching trailer light controllers often require technical skill and involve permanently altering the vehicle towing wiring harness. Modern vehicles utilize complex wiring and signals to activate the tail lamps. To determine the appropriate signal carried by the electrical wire, one needs to pierce the insulation of the wire or unplug the wire connector at the termination point and probe each individual wire while performing vehicle rear lamp operations. This process is time consuming or may lead to electrical system malfunction. Because this difficulty of modification tends to increase with vehicle complexity and vehicle cost, damage can occur to expensive new vehicles.

An object of the present invention is to bypass the necessity of using and/or tapping into towing vehicle wiring to connect trailer lights for towing.

Another object of the invention is to provide ease of installation and removal from the towing vehicle as needed.

Still another object of the present invention is to avoid the permanent installation of trailer lighting modules, which are typically hardwired to the towing vehicle lighting connections by physically piercing the vehicle wires.

Yet another object of the present invention is to eliminate the need to keep many vehicle-specific trailer lighting kits in inventory by replacing those lighting kits with one universal trailer lighting kit.

Additional objects and advantages of the invention will be set forth in the description that follows, and in part will be apparent from the description, or may be learned by practice of the invention. The objects and advantages of the invention may be realized and obtained by means of the instrumentalities and combinations pointed out in the appended claims.

SUMMARY

To achieve the foregoing objects, and in accordance with the purposes of the invention as embodied and broadly described in this document, there is provided a trailer lighting activation system. In one embodiment, the system includes a vehicle light sensor, an ambient light sensor, a microcontroller and an overcurrent monitor. The vehicle light sensor is configured to be removably attached to a towing vehicle light to detect a light output of the towing vehicle light, and to provide a vehicle light sensor output signal in response to the light output of the towing vehicle light. The ambient light sensor is configured to detect an ambient light level and to provide an output signal in response to the ambient light level. The microcontroller is coupled to the vehicle light sensor output and to the ambient light sensor and has an output configured to be coupled to and to energize a trailer light. The overcurrent monitor is configured to be coupled to the trailer light and to monitor current drawn by the trailer lighting activation system. The microcontroller includes programming instructions for energizing the trailer light in response to the ambient light sensor output signal and the vehicle light sensor output signal.

In some embodiments, the microcontroller is configured to take a plurality of readings of the ambient light sensor output signal and to use the plurality of readings to calculate an average ambient light sensor output level. The microcontroller can be configured to use the average ambient light sensor output level to calculate a brake lamp trigger value and to compare the vehicle light sensor output signal to the brake lamp trigger value to determine whether to energize the trailer light. The microcontroller also can be configured to use the average ambient light sensor output level to calculate a running lamp trigger value and to compare the vehicle light sensor output signal to the running lamp trigger value to determine whether to energize the trailer light.

According to another aspect of the invention, the microcontroller can be configured to detect the number of a plurality of vehicle light sensors and to use the light sensor output signals of the plurality of vehicle light sensors to identify the lighting configuration or pattern of the towing vehicle.

A method for activating trailer lighting according to the invention includes attaching each of a plurality of vehicle light sensors to a corresponding towing vehicle light of a plurality of towing vehicle lights. Each of the plurality of vehicle light sensors is configured to detect a light output of the corresponding towing vehicle light and to provide a vehicle light sensor output signal in response to the light output of the corresponding towing vehicle light. As a result, the plurality of vehicle light sensors are configured to provide a plurality of vehicle light sensor output signals. The method further includes providing an ambient light sensor configured to detect an ambient light level and to provide an output signal in response to the ambient light level. The method also includes: providing a microcontroller coupled to each of the plurality of vehicle light sensors and to the ambient light sensor and having an output coupled to a plurality of trailer lights; and with the microcontroller, generating signals to energize the plurality of trailer lights in response to the ambient light sensor output signal and the plurality of vehicle light sensor output signals.

In some methods of the invention, the microcontroller can take a plurality of readings of the ambient light sensor output signal and use the plurality of readings to calculate an average ambient light sensor output level. The microcontroller can use the average ambient light sensor output level to calculate a brake lamp trigger value and can compare at least one of the plurality of vehicle light sensor output signals to the brake lamp trigger value to determine whether to energize at least one of the plurality of trailer lights.

According to another aspect of the invention, the microcontroller can use the average ambient light sensor output level to calculate a running lamp trigger value and can compare at least one of the plurality of vehicle light sensor output signals to the running lamp trigger value to determine whether to energize at least one of the plurality of trailer lights.

BRIEF DESCRIPTION OF THE DRAWINGS

The accompanying drawings and appendices, which are incorporated in and constitute a part of the specification, illustrate the presently preferred embodiments of the invention and, together with the general description given above and the detailed description of the preferred methods and embodiments given below, serve to explain the principles of the invention.

DETAILED DESCRIPTION

Reference will now be made in more detail to presently preferred embodiments of the invention, as illustrated in the accompanying drawings. While the invention is described more fully with reference to these examples and drawings, the invention in its broader aspects is not limited to the specific details, representative devices, and illustrative examples shown and described. Rather, the description, which follows is to be understood as a broad, teaching disclosure directed to persons of ordinary skill in the appropriate arts, and not as limiting upon the invention.

Figure 1:
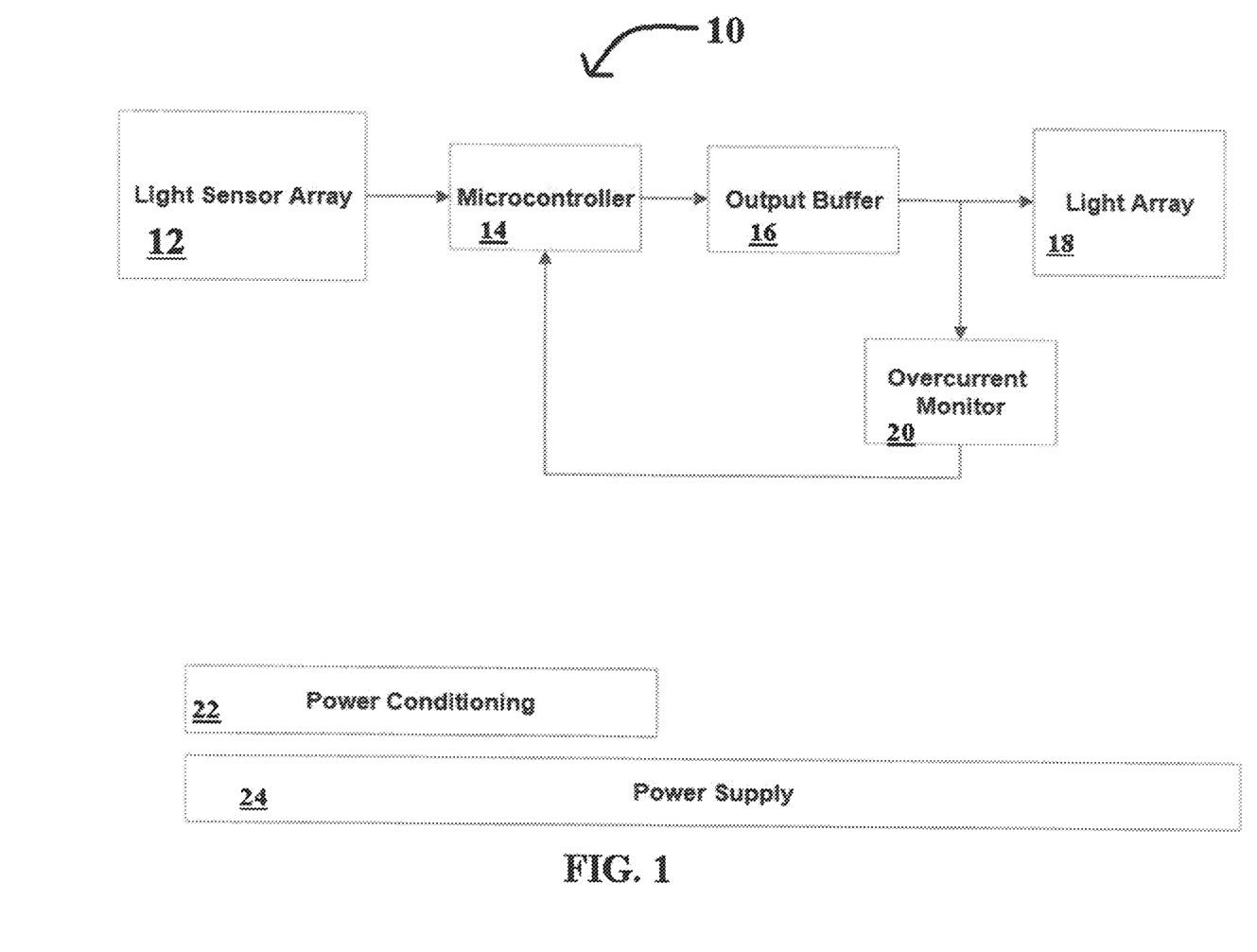
FIG. 1 is a block diagram of one embodiment of a trailer light activation system according to the present invention.
Figure 8:
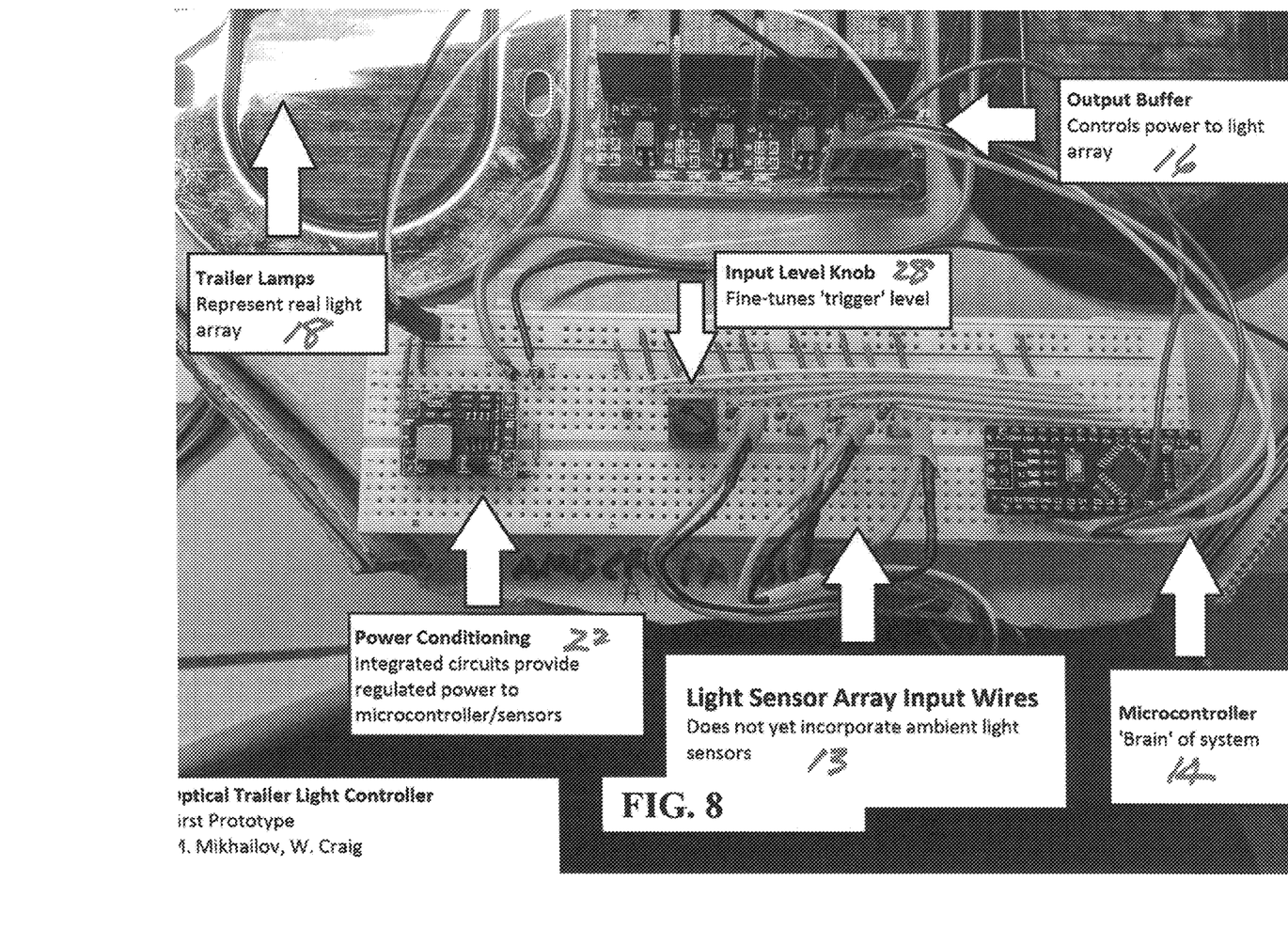
FIG. 8 is an enlarged view of the circuit components of the prototype trailer light activation system of FIG. 4.
Figure 9:
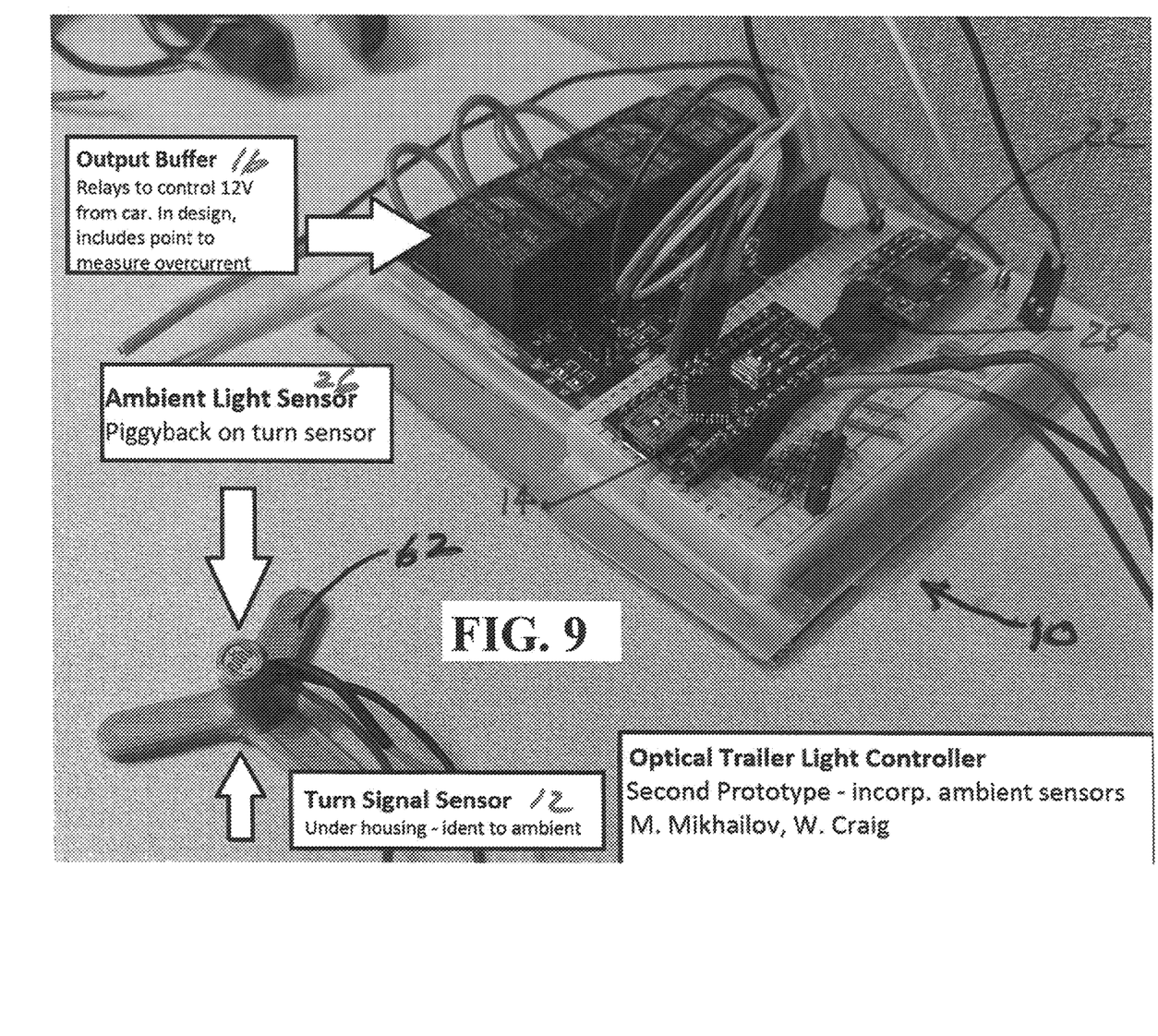
FIG. 9 is an enlarged view of the circuit components of an embodiment of a trailer light activation system that includes a housing for holding an ambient light sensor in a "piggyback" position over a vehicle light sensor.

Referring to FIGS. 1 and 8-9, in some embodiments, the trailer light activation system 10 includes a plurality of light sensors 12 that are removably attached (such as by adhesive pads) to each of the rear lamps of a towing vehicle 50, including brake lamps 52a, 52b, 52c, a left rear turn lamp 54, a right rear turn lamp 56, and rear running lamp 58. The vehicle light sensors 12 detect a light output of each of the towing vehicle rear lamps 52, 54, 56, 58 and provide input signals to a microcontroller 14 in response to the light output of the towing vehicle rear lamps. The microcontroller 14 is coupled to trailer lights (not shown) via an output buffer 16 to energize the trailer lights. One or more ambient light sensors 26 can be used to detect ambient light levels and to provide to the microcontroller 14 a signal in response to the ambient light level. The microcontroller 14 is programmed to function as described below to energize the trailer lights in response to the ambient light sensor output signal and the vehicle light sensor output signal. The vehicle light sensors 12 and ambient light sensors 26 can be coupled to the microcontroller 14 via a wired connection or a wireless communication link. An overcurrent monitor 20 monitors current drawn by the trailer lights. The trailer light activation system 10 is powered by a power supply 24, which can be on the towing vehicle 50, or on the trailer (not shown) (such as via a solar cell or battery on the trailer) and can provide appropriate power via a power conditioner 22.

The overcurrent monitor 20 protects the electrical system of the towing vehicle 10 in the case of faulty wiring. The overcurrent monitor 20 initiates a fail-safe behavior in the event that sensor or trailer wiring fails or shorts out and places an unsustainable load on the tow vehicle's accessory circuit. This may be achieved via several methods:

An inductive probe can be placed on the power supply line from the towing vehicle power point.

Small resistors can be placed in series with the light outputs. Potential can be read by the microcontroller 14 after the resistor and compared to a reference, allowing the system to calculate current draw.

A current metering solution such as the Texas Instruments INA260 digital current/power monitor can be employed to continuously monitor output current.

When excessive current draw is detected, the trailer light activation system 10 can trigger a failure mode response, which can include one or more of the following:

Disabling the entire system.

Disabling a particular circuit.

Isolating and current-choking circuits to enable low power operation despite a short.

Figure 2:
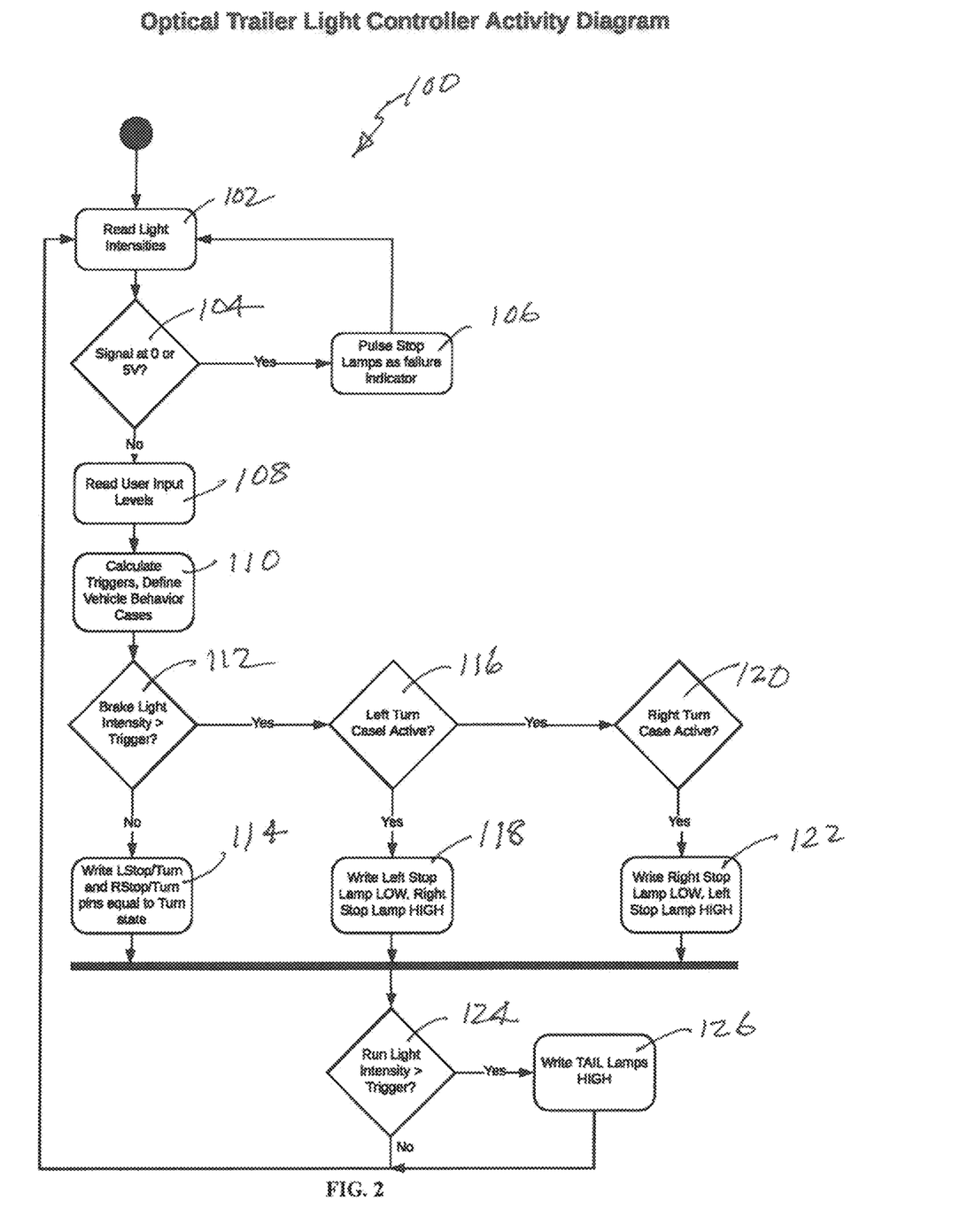
FIG. 2 is an activity diagram illustrating the programmed operation of the microcontroller of the system of FIG. 1.
Figure 3:
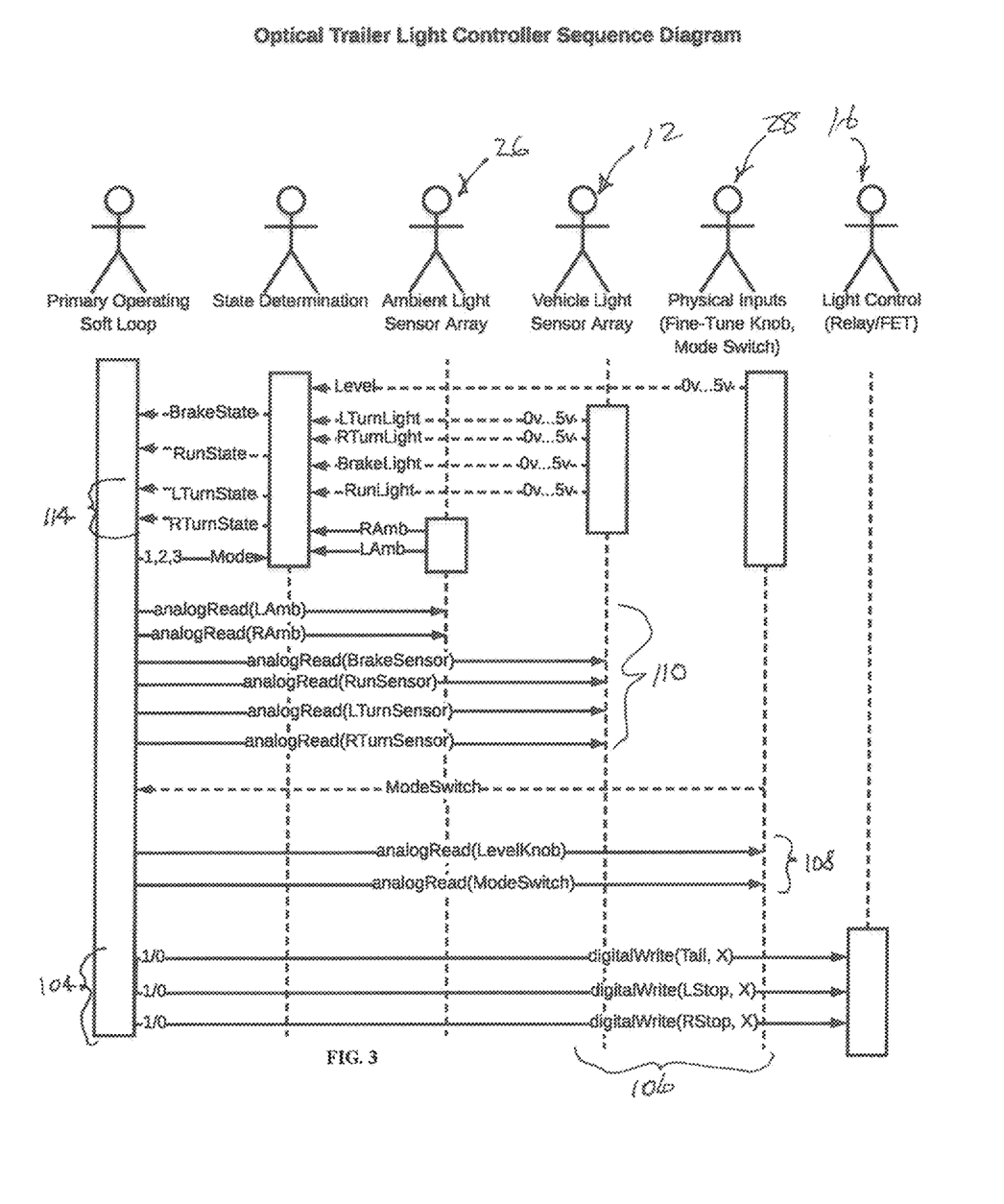
FIG. 3 is a sequence diagram describing the interaction of object oriented classes used in programming the operation of the microcontroller of the system of FIG. 1.

Referring now to FIGS. 2 and 3, an exemplary operation of the trailer light activation system 10 of FIG. 1 will be described. FIG. 2 is an activity diagram 100 illustrating the programmed operation of the microcontroller 14 of the system of FIG. 1. FIG. 3 is a sequence diagram describing the interaction of object oriented classes used in programming the operation of the microcontroller 14. At step 102, the microcontroller 14 reads the light intensity signals of each of the vehicle light sensors 12 mounted to the towing vehicle rear lamps 52, 54, 56, 58 of the towing vehicle 10. If the light intensity signal of any of the vehicle light sensors 12 is zero or is a defined maximum voltage (e.g., 5 volts) (step 104), the microcontroller 14 sends a pulsed signal to the output buffer 16 that causes the trailer rear stop lamps (not shown) to flash on and off to indicate that the system is not properly sensing the output of the vehicle light sensor 12 (step 106).

Returning to step 104, if the light intensity is not zero or the defined maximum voltage, the microcontroller 14 reads the user input levels from user inputs 28 (step 108) and calculates trigger levels and defines vehicle behavior cases (step 110). The user inputs 28 can include a knob for manually fine tuning the trigger level and mode switches for manually selecting the vehicle lighting configuration or pattern as described below. In one exemplary process, trigger levels are calculated by taking sample readings of the output levels of the ambient light sensor 26 and of the output levels of the vehicle light sensors 12. The microcontroller 14 then calculates an average output level of the ambient light sensor 26 and one of the vehicle light sensors 12 and uses those average levels to set a flag that accurately indicates whether the corresponding vehicle rear lamp is on. During operation, when the trailer light activation system 10 reads a light sensor output that exceeds the relevant average, the microcontroller 14 can set the flag value, e.g. to 1, to accurately indicate that the relevant vehicle rear lamp is on. When the light sensor output is less than the relevant average, the microcontroller 14 can set the flag value, e.g. to 0, to accurately indicate that the relevant vehicle rear lamp is off.

Still referring to step 110, the microcontroller 14 also determines what lighting configuration or pattern is used by the towing vehicle 10 to provide rear lighting functionality. Some vehicles integrate braking and turn signals into a single bulb and vary its intensity, some flash their lights, some have separate lights for every single function, etc. Typically, these different configurations or patterns include the following:

Fully divorced (One lamp per function)
Semi-integrated (One lamp may perform two functions by varying intensity)
Fully-integrated (One lamp may perform multiple functions by varying intensity)
Sequential (One set of lamps will perform multiple functions, may only pulse for a short time.)

Different use cases can implemented with the microcontroller 14 so that the system 10 can operate with towing vehicles that utilize each of these different lighting patterns. In one embodiment, the lighting pattern of the towing vehicle can be manually selecting using the mode switch user input 28. In another embodiment, the lighting pattern of the towing vehicle can be automatically determined as follows. When the vehicle light sensors 12 are mounted to the towing vehicle rear lamps 52, 54, 56, 58 and connected to the inputs of the trailer light activation system 10, the microcontroller 14 can detect the number of light sensor inputs and which inputs are active. From that information, the system 10 can determine which lighting configuration the towing vehicle uses.

Still referring to FIG. 2, at step 112 the output level of the vehicle light sensor 12 on one or more of the brake lamps 52a, 52b, 52c is compared to a brake lamp trigger value. If the brake sensor output level is less than or equal to the brake lamp trigger value (indicating that the brake lamps are off), the microcontroller 14 generates control signals for energizing the trailer rear lamps based on the state of the vehicle turn lamps (step 114). If the brake sensor output level is greater than the brake lamp trigger level (indicating that the vehicle brake lamps are on), the microcontroller 14 determines whether the output levels of the vehicle turn lamps match the pattern for a left turn (step 116). If so, the microcontroller 14 generates appropriate control signals to energize the trailer lamps to signal a left turn and braking (step 118). Referring back to step 116, if the output levels of the vehicle turn lamps do not match the pattern of a left turn, the microcontroller 14 confirms that the output levels of the vehicle turn lamps match the pattern for a right turn (step 120) and generates appropriate control signals to energize the trailer lights to signal a right turn with braking (step 122).

Still referring to FIG. 2, at step 124, the output level of the vehicle light sensor 12 on the rear running lamp 58 is compared to the running lamp trigger value. If the running lamp sensor output level is greater than the running lamp trigger value (indicating that the vehicle running lamp is on), the microcontroller 14 generates a control signal to energize the trailer running lamp (step 126). If the running lamp sensor output level is less than or equal to the running lamp trigger value (indicating that the vehicle running lamp is off), the microcontroller 14 returns to step 102 to again read the light intensity signals of each of the vehicle light sensors 12 mounted to the towing vehicle rear lamps 52, 54, 56, 58.

FIGS. 4-7 illustrate one embodiment of a prototype of the trailer light activation system 10 according to the present invention installed on a towing vehicle 50. The prototype was constructed to perform the system's basic functions in a static environment with consistent lighting. The vehicle light sensors 12 and ambient light sensors 26 were implemented using light-sensitive resistors. The vehicle light sensor 12 for a given vehicle rear lamp is positioned on the area of the rear lamp least affected by ambient light. Surrounding areas up to about 50 mm away from the positioned vehicle light sensor are covered in opaque adhesive material to limit the amount of natural light to which the sensor is exposed and thereby reduces the effects of ambient light.

Figure 4:
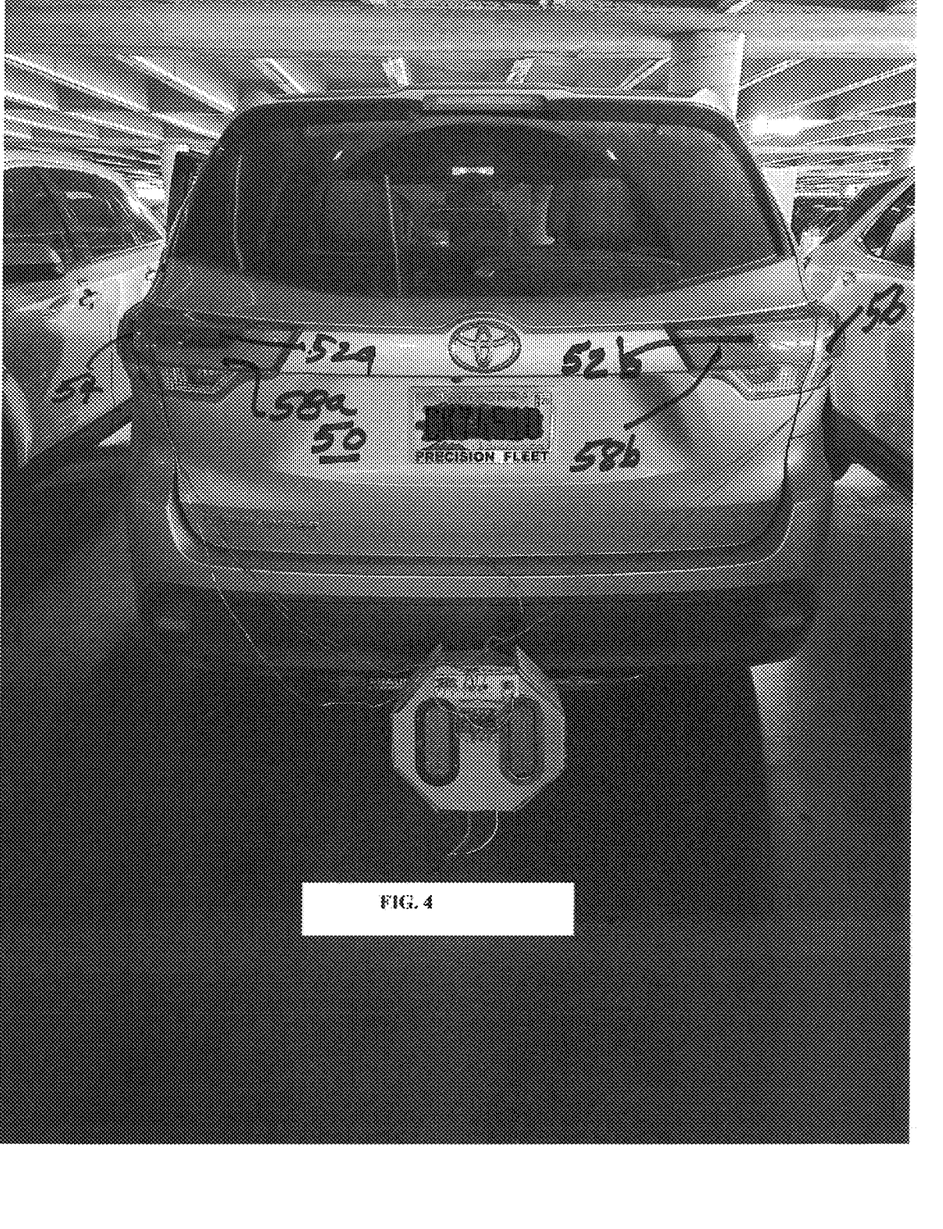
FIG. 4 is an end view of a towing vehicle showing the trailer light activation system of FIG. 1 mounted on a test fixture installed on a towing vehicle.
Figure 5:
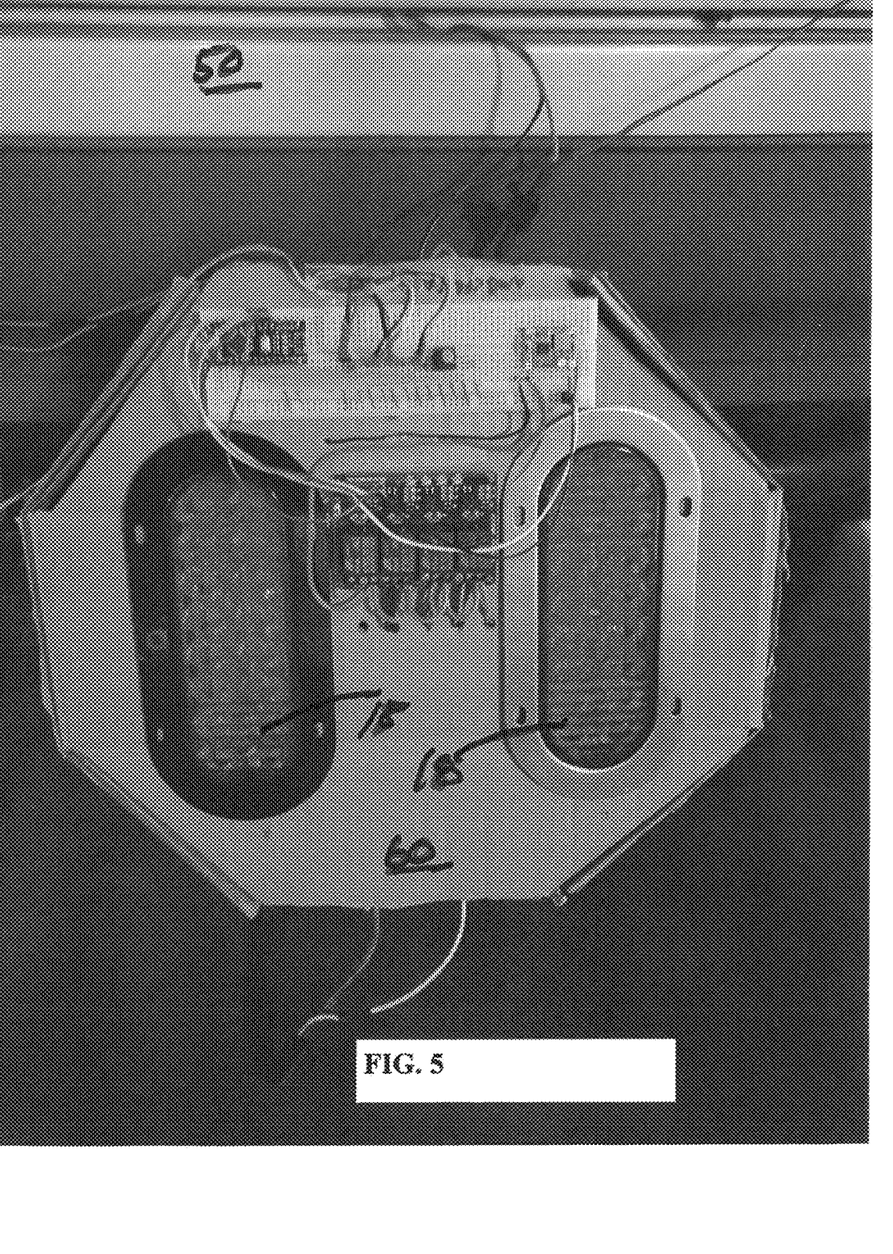
FIG. 5 is an enlarged view of the prototype system of FIG. 4.
Figure 6:
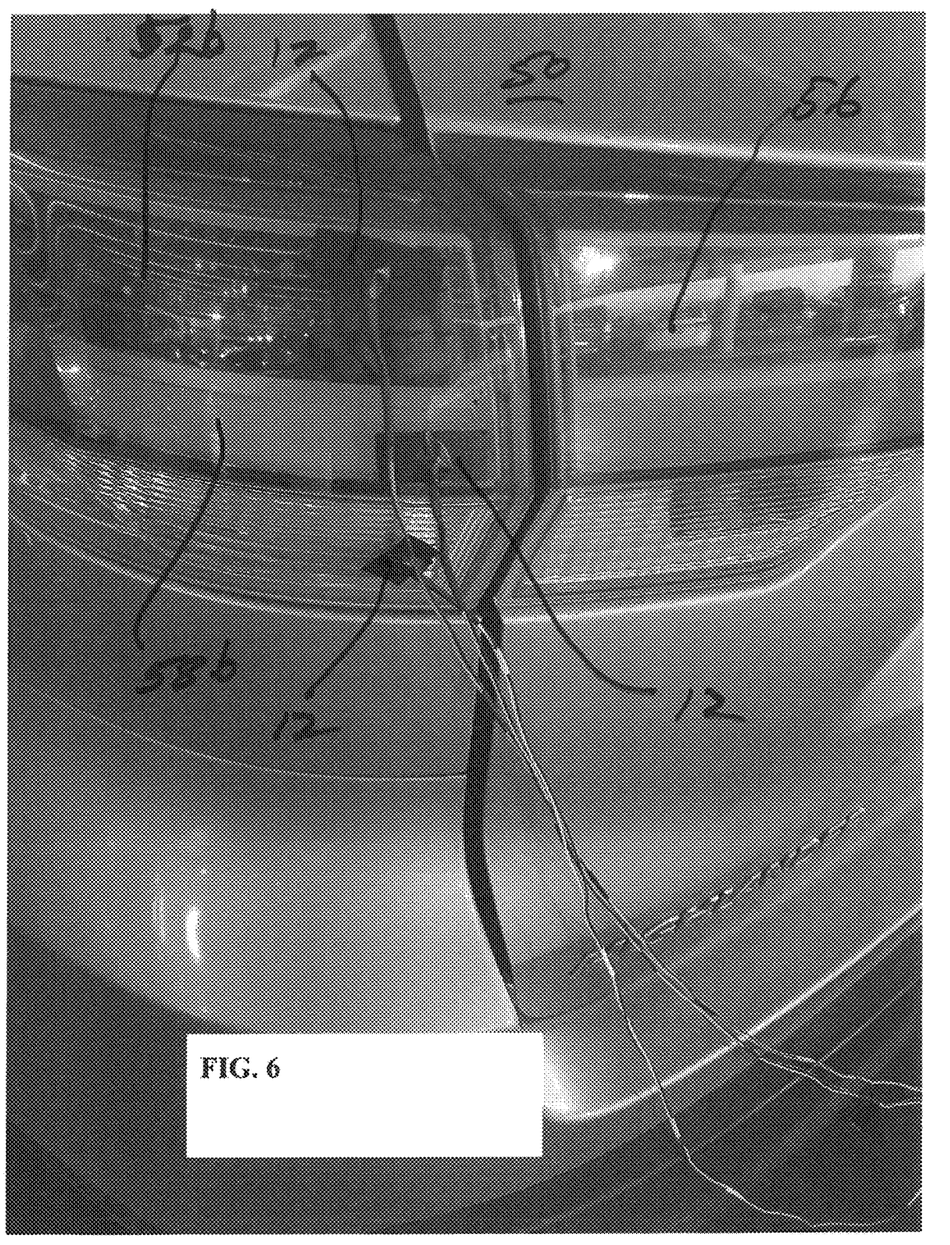
FIGS. 6 and 7 are enlarged views showing a vehicle light sensor of the trailer light activation system of FIG. 1 removably attached one of the rear lights of the towing vehicle.
Figure 7:
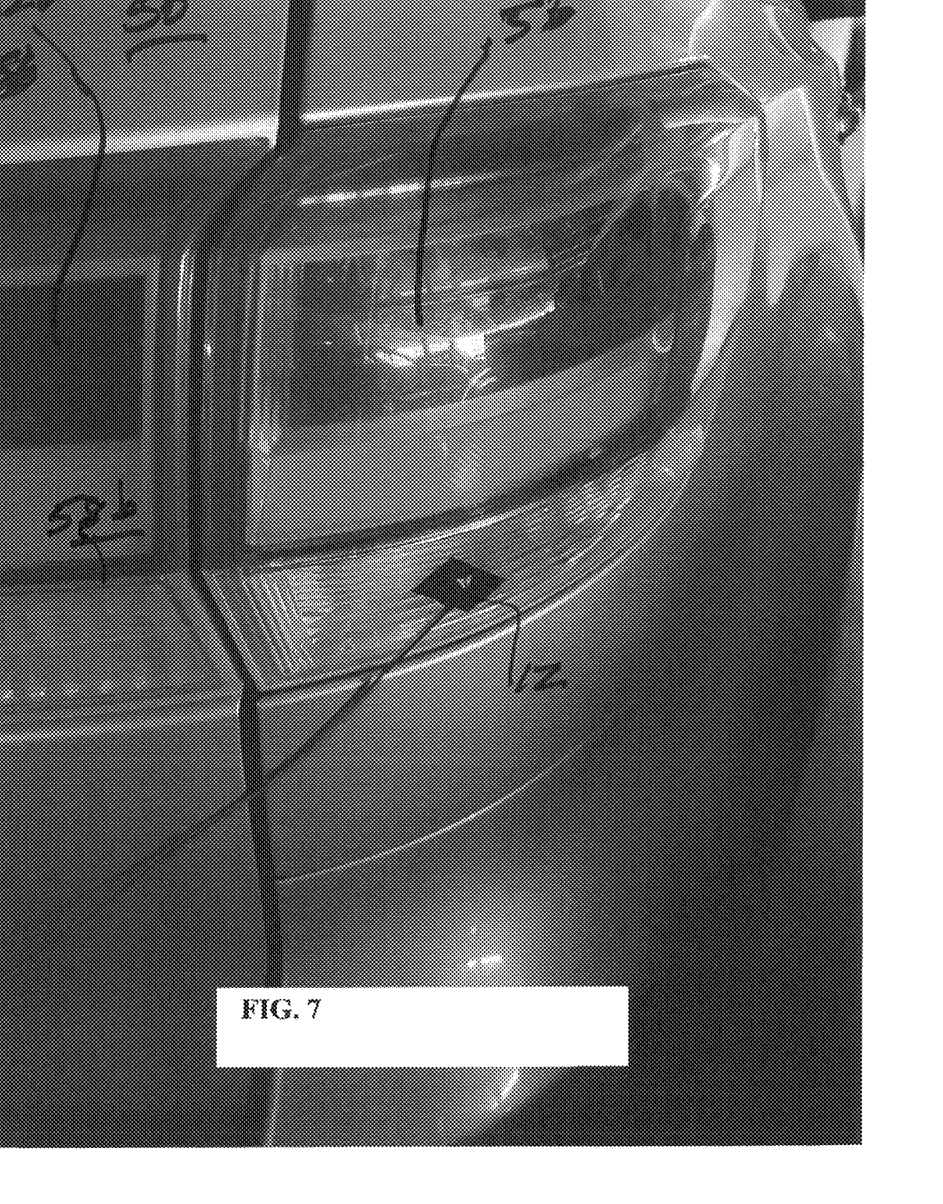

Initial testing of the prototype trailer light activation system was conducted with a 2017 Toyota Highlander, which was observed to have a fully divorced light pattern. The prototype trailer light activation system was mounted to a trailer light test fixture 60 designed to simulate a trailer lighting system. FIG. 4 shows the test fixture 60 mounted to the rear of a 2017 Toyota Highlander, which served as the towing vehicle 50. FIG. 5 shows an enlarged view of the test fixture 60, which included two simulated trailer tail lights 18. Testing was conducted in a dimly lit parking garage, and the unit was shown to function as intended. While the simulated trailer lights responded very quickly to LED lights on the vehicle, incandescent bulbs took a significant amount of time to emit enough light to reach the target trigger level. Initial testing revealed that differences in ambient lighting—particularly sunlight acting more on one side of the vehicle—could render the unit inoperable. For example, one set of vehicle light sensors exposed to sunlight could exceed the target threshold on that side, erroneously causing a trailer turn signal to stay on or brake lights to turn on. To address this issue, the ambient light sensor 26 was placed as close as possible to the tail lamp light collector, but with the ambient light collector facing outward. As can be seen in FIG. 9, in some embodiments the trailer light activation system 10 can include a light sensor housing 62 configured to hold an ambient light sensor 26 in a "piggyback" position over a vehicle light sensor 12.

Having read this disclosure, it will also be understood by those having skill in the art that the system of the present invention enjoys a number of advantages over the prior art. For example, the system can be installed on a towing vehicle without the necessity of using and/or tapping into the towing vehicle wiring. It is easy to install and remove from the vehicle as needed. It avoids the permanent installation of trailer lighting modules, which are typically hardwired to the trailer lighting connections by physically piercing the vehicle wires. Moreover, the system eliminates the need to keep many vehicle-specific trailer lighting kits in inventory by replacing those lighting kits with one universal trailer lighting kit.

It will also be understood by those having skill in the art that modifications may be made to the invention without departing from its spirit and scope. Therefore, the invention in its broader aspects is not limited to the specific details, representative devices, and illustrative examples shown and described. Accordingly, departures may be made from such details without departing from the spirit or scope of the general inventive concept.

What is claimed is:

1. A trailer lighting activation system comprising:
   a vehicle light sensor configured to be removably attached to a towing vehicle light, to detect a light output of the towing vehicle light, and to provide a vehicle light sensor output signal in response to the light output of the towing vehicle light;
   an ambient light sensor configured to detect an ambient light level and to provide an output signal in response to the ambient light level;
   a microcontroller coupled to the vehicle light sensor output and to the ambient light sensor and having an output configured to be coupled to and to energize a trailer light; and
   an overcurrent monitor configured to be coupled to the trailer light, to monitor a current drawn by the trailer lighting activation system, and to trigger a failure mode response to protect an electrical system of the towing vehicle if the monitored current exceeds a predetermined excessive current amount;
wherein the microcontroller includes programming instructions for energizing the trailer light in response to the ambient light sensor output signal and the vehicle light sensor output signal.

2. The trailer light activation system of claim 1 wherein the microcontroller is configured to take a plurality of readings of the ambient light sensor output signal and to use the plurality of readings to calculate an average ambient light sensor output level.

3. The trailer light activation system of claim 2 wherein the microcontroller is configured to use the average ambient light sensor output level to calculate a brake lamp trigger value and to compare the vehicle light sensor output signal to the brake lamp trigger value to determine whether to energize the trailer light.

4. The trailer light activation system of claim 2 wherein the microcontroller is configured to use the average ambient light sensor output level to calculate a running lamp trigger value and to compare the vehicle light sensor output signal to the running lamp trigger value to determine whether to energize the trailer light.

5. The trailer light activation system of claim 1 wherein the trailer lighting activation system includes a plurality of vehicle light sensors and wherein the microcontroller is configured to detect the number of light sensors and to use the light sensor output signals of the plurality of vehicle light sensors to determine a lighting pattern of the towing vehicle.

6. A trailer lighting activation system comprising:
a vehicle light sensor configured to be removably attached to a towing vehicle light, to detect a light output of the towing vehicle light, and to provide a vehicle light sensor output signal in response to the light output of the towing vehicle light;
an ambient light sensor configured to detect an ambient light level and to provide an output signal in response to the ambient light level;
a microcontroller coupled to the vehicle light sensor output and to the ambient light sensor and having an output configured to energize a trailer light; and
an overcurrent monitor coupled to the trailer light;
wherein the microcontroller includes programming instructions for energizing the trailer light in response to the ambient light sensor output signal and the vehicle light sensor output signal; and
wherein the overcurrent monitor is configured to monitor current drawn by the trailer light and to trigger a failure triode response to protect an electrical system of the towing vehicle if the monitored current drawn by the trailer light exceeds a predetermined excessive current amount.

7. The trailer light activation system of claim 6 wherein the microcontroller is configured to take a plurality of readings of the ambient light sensor output signal and to use the plurality of readings to calculate an average ambient light sensor output level.

8. The trailer light activation system of claim 7 wherein the microcontroller is configured to use the average ambient light sensor output level to calculate a brake lamp trigger value and to compare the vehicle light sensor output signal to the brake lamp trigger value to determine whether to energize the trailer light.

9. The trailer light activation system of claim 7 wherein the microcontroller is configured to use the average ambient light sensor output level to calculate a running lamp trigger value and to compare the vehicle light sensor output signal to the running lamp trigger value to determine whether to energize the trailer light.

10. The trailer light activation system of claim 6 wherein the trailer lighting activation system includes a plurality of vehicle light sensors and wherein the microcontroller is configured to detect the number of the plurality of vehicle light sensors and to use the number and the light sensor output signals of the plurality of vehicle light sensors to determine a lighting pattern of the towing vehicle.

11. A method for activating trailer lighting comprising:
attaching each of a plurality of vehicle light sensors to a corresponding towing vehicle light of a plurality of towing vehicle lights, wherein said each of the plurality of vehicle light sensors is configured to detect a light output of the corresponding towing vehicle light and to provide a vehicle light sensor output signal in response to the light output of the corresponding towing vehicle light, whereby the plurality of vehicle light sensors are configured to provide a plurality of vehicle light sensor output signals;
providing an ambient light sensor configured to detect an ambient light level and to provide an output signal in response to the ambient light level;
providing a microcontroller coupled to said each of the plurality of vehicle light sensors and to the ambient light sensor and having an output coupled to a plurality of trailer lights; and
with the microcontroller, generating signals to energize the plurality of trailer lights in response to the ambient light sensor output signal and the plurality of vehicle light sensor output signals; and
with an overcurrent monitor coupled to the trailer light, monitoring current drawn by the trailer light, and triggering a failure mode response to protect an electrical system of the towing vehicle if the monitored current drawn by the trailer light exceeds a predetermined excessive current amount.

12. The method of claim 11 further comprising using the microcontroller to take a plurality of readings of the ambient light sensor output signal and to use the plurality of readings to calculate an average ambient light sensor output level.

13. The method of claim 12 further comprising, with the microcontroller, using the average ambient light sensor output level to calculate a brake lamp trigger value and comparing at least one of the plurality of vehicle light sensor output signals to the brake lamp trigger value to determine whether to energize at least one of the plurality of trailer lights.

14. The method of claim 12 further comprising, with the microcontroller, using the average ambient light sensor output level to calculate a running lamp trigger value and comparing at least one of the plurality of vehicle light sensor output signals to the running lamp trigger value to determine whether to energize at least one of the plurality of trailer lights.

15. The method of claim 11 further comprising, with the microcontroller, detecting the number of the plurality of vehicle light sensors, and using the number of the plurality of vehicle light sensors and the plurality of vehicle light sensor output signals to determine a lighting pattern of the towing vehicle.

* * * * *